United States Patent [19]

Viellet

[11] Patent Number: 4,869,624
[45] Date of Patent: Sep. 26, 1989

[54] DEVICE FOR RELEASABLY CLAMPING A CUTTING INSERT ON A TOOL-HOLDER

[75] Inventor: Guy Viellet, Neuilly sur Seine, France

[73] Assignee: Societe Industrielle d'Electro-Metallurgie, Paris Cedex, France

[21] Appl. No.: 135,258

[22] Filed: Dec. 21, 1987

[30] Foreign Application Priority Data

Dec. 30, 1986 [FR] France ................ 86 18348

[51] Int. Cl.⁴ .................................... B23B 27/00
[52] U.S. Cl. .................................... 407/104; 407/105
[58] Field of Search .................. 407/104, 105

[56] References Cited

U.S. PATENT DOCUMENTS

| 3,341,920 | 9/1967 | Kelm | 407/104 |
| 3,341,923 | 9/1967 | Kelm | 407/104 |
| 3,514,826 | 6/1970 | Dawkins | 407/104 |
| 3,747,179 | 7/1973 | Lovendahl | 407/104 |
| 4,397,592 | 8/1983 | Erickson | 407/104 |
| 4,632,593 | 12/1986 | Stashko | 407/104 |

FOREIGN PATENT DOCUMENTS

| 1602721 | 5/1970 | Fed. Rep. of Germany . | |
| 2239093 | 4/1973 | Fed. Rep. of Germany | 407/104 |
| 1562462 | 4/1969 | France . | |
| 1562463 | 4/1969 | France . | |
| 2109189 | 5/1972 | France | 407/104 |
| 1207639 | 1/1986 | U.S.S.R. | 407/104 |
| 1315153 | 6/1987 | U.S.S.R. | 407/104 |

*Primary Examiner*—Frederick R. Schmidt
*Assistant Examiner*—Blynn Shideler
*Attorney, Agent, or Firm*—Dickstein, Shapiro & Morin

[57] ABSTRACT

This invention relates to a device for releasably clamping a cutting insert on a tool-holder. A screw having a threaded shank adapted to be screwed in a tapped hold in the tool-holder passes through an eccentric cylindrical hole in the insert. The head of the screw includes, from the shank, a truncated bearing surface, a cylindrical bearing surface and a shoulder. The screw head cooperates with the edge and the wall of the eccentric hole in the insert to press the sides of the latter against the lateral stop faces of the tool-holder and the base of said insert against the bearing face of said tool-holder.

9 Claims, 2 Drawing Sheets

DEVICE FOR RELEASABLY CLAMPING A CUTTING INSERT ON A TOOL-HOLDER

FIELD OF THE INVENTION

The present invention relates to a device for releasably clamping a cutting insert on a tool-holder.

BACKGROUND OF THE INVENTION

A device of this type is known, particularly by French Pat. No. 2 109 189. The tool holder disclosed therein presents a bearing face and two stop faces in dihedral form perpendicular to said bearing face, in order to receive the insert. This known device comprises a screw of which the threaded shank adapted to be screwed in a tapped hole in the tool holder, passes through a cylindrical hole in the insert which is eccentric when the latter is suitably positioned in contact with the faces mentioned above and without the wall of this eccentric hole touching the shank of the screw. The head of this screw presents a truncated bearing surface cooperating with an annular portion of a likewise truncated bearing surface bordering the eccentric hole of the insert in order to press the sides thereof against the stop faces of the tool holder and concomitantly to clamp said insert against the bearing face of said tool-holder.

SUMMARY OF THE INVENTION

It is an object of the present invention to improve this clamping so that the insert is perfectly fast with the tool-holder and that no vibration appears therebetween under the effect of the stresses to which said insert is subjected during cutting.

To this end and in accordance with the invention, the screw head comprises, from the shank:

a truncated bearing surface of short longitudinal extent which cooperates with the edge of the eccentric hole in the insert to bring each side of the insert towards each corresponding stop face of the tool-holder and to begin to clamp them against one another, causing the shank of the screw to bend, a substantially cylindrical bearing face which cooperates with the wall of the eccentric hole in the insert, to press the insert sides further against the stop faces, shortening the bending overhang (p) of the shank for a substantially constant camber, and a shoulder projecting from the eccentric hole in the insert and which is provided to clamp the insert against the bearing face of the tool-holder.

The shoulder of the screw head is advantageously truncated and cooperates with the eccentric edge of the insert, to press the insert progressively against the bearing face of the tool-holder.

Each stop face of the tool-holder is undercut between 15 minutes and 1 degree on the sides of the insert so the insert bears against the outer edge of each stop face.

The invention will be more readily understood on reading the following description with reference to the accompanying drawings.

DETAILED DESCRIPTION OF THE PREFERRED EMBODIMENT

Figure 2:
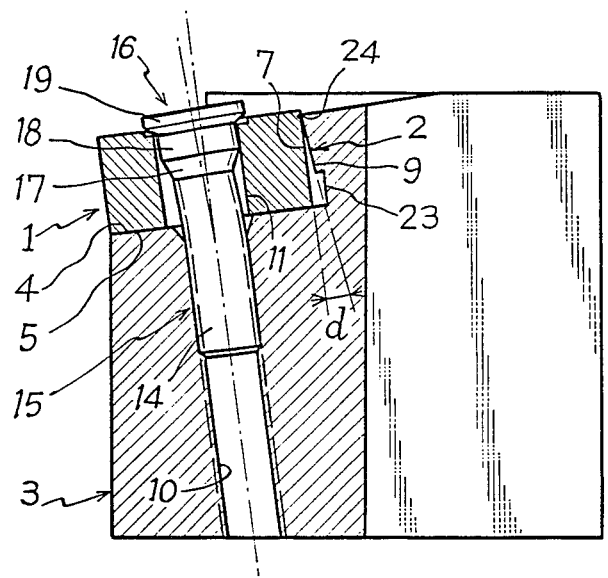
FIG. 2 is a section on a larger scale along line II—II of FIG. 1.
Figure 1:
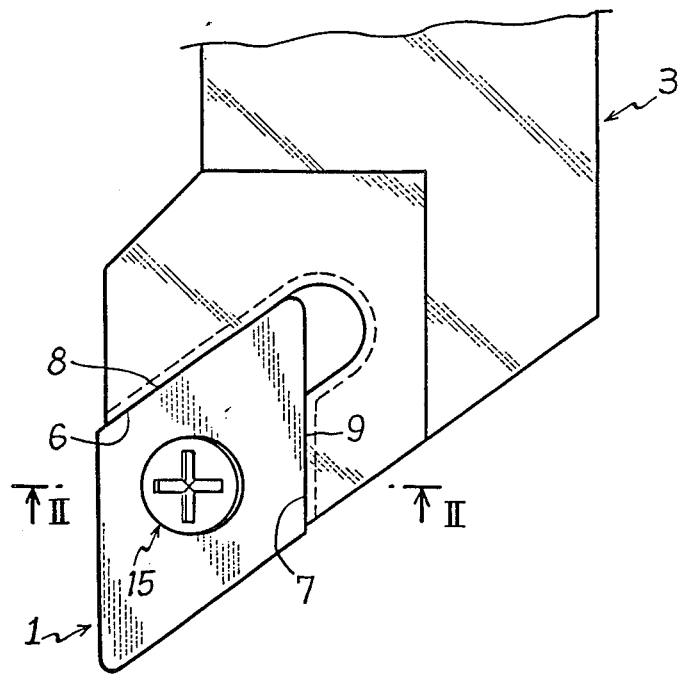
FIG. 1 is a plan view of a tool-holder on which a cutting insert is fixed by means of the device of the invention.

Referring now to the drawings, FIGS. 1 and 2 show the cutting insert 1 positioned in a housing 2 in a tool-holder 3 for the purpose of clamping the insert firmly and precisely without clearance in said housing.

In the embodiment shown, the insert 1 is shaped as a straight prism with a diamond-shaped base 4 which is normally placed on a bearing face 5 of the housing 2 of the tool-holder. Insert sides 6 and 7 are applied against the stop faces 8 and 9 respectively of the housing.

Figure 3:
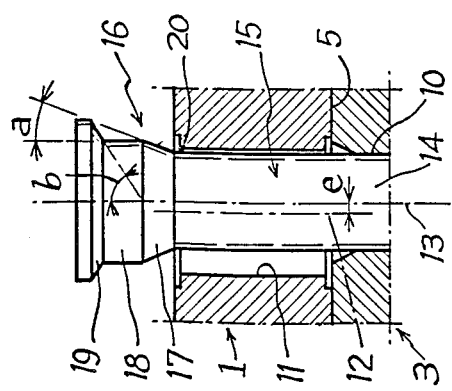

A tapped hole 10 is machined in the tool-holder 3 perpendicular to the bearing face 5 and substantially at the center of the insert 1. This hole in the insert defines a cylindrical hole 11 (FIGS. 2 to 5) having an axis 12 which is eccentric with respect to an axis 13 of the tapped hole 10 when the sides 6 and 7 of the insert are in contact with the stop faces 8 and 9 of the housing 2 of the tool-holder 3. The threaded shank 14 of a clamping screw 15 does not touch the wall of the hole 11 in the insert when the shank is screwed in the tapped hole 10 and the head 16 of the screw is located outside this hole 11 (FIG. 3).

The head 16 presents a particular shape and comprises, from the shank 14, a truncated bearing surface 17, a substantially cylindrical bearing surface 18 and a shoulder 19. These different parts 17 to 19 of the head are dimensioned, with respect to the diameter of the hole 11, to the offset "e" of this hole 11 relative to the tapped hole 10, to the diameter of the threaded shank 14 and to the thickness of the insert 1. The screw head 16 contacts the cylindrical hole 11 in different successive phases illustrated in FIGS. 3 to 5 and described hereinafter.

Figure 4:
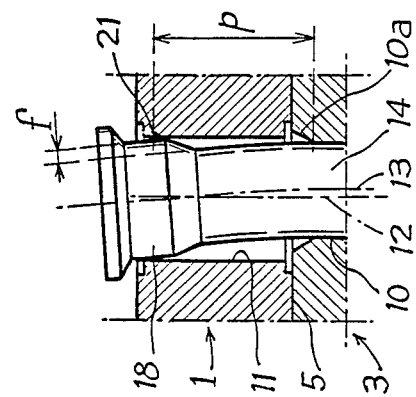

At the beginning of screwing (FIG. 3), the truncated bearing surface 17, of which the slope "a" with respect to the axis may be between 42 and 44 degrees, comes into contact with the arcuate part 20 of the outer edge of the hole 11. Because of its slope, the truncated bearing surface forces the sides 6 and 7 of the insert against the stop faces 8 and 9 of the housing 2 of the tool-holder. When this contact is established, the bending of the shank 14 of the screw 15, having axis 13, begins to buckle as illustrated in FIG. 4. Consequently, the insert 1, in response to the elastic deformation of the shank 14, is firmly applied against the stop faces 8 and 9 of the housing 2 of the tool-holder.

As screwing continues, the arcuate part 20 of the outer edge of the hole 11 contacts the cylindrical bearing surface 18 of the screw head 16 (FIG. 4). As screwing further continues, the point of contact 21 of this cylindrical bearing surface 18 on the wall of the hole 11 moves closer to the bearing face 5 of the tool-holder. Consequently, the bending overhang "p" of the screw shank 14 decreases whilst the camber "f" remains substantially constant; the overhang "p" is counted from the point of contact 21 to the bottom of milling 10a which is level with the bearing face 5 of the tool-holder and in which the tapped hole 10 pens out. The elastic deformation of the screw shank 14 increases and the reaction of the shank to such deformation increases, which then increases the pressure of the sides 6 and 7 of the insert against the stop faces 8 and 9 of the tool-holder.

At the end of screwing (FIG. 5), the shoulder 19 of the head abuts against the arcuate part 22 of the edge of the hole 11 opposite part 20 mentioned above. Shoulder 19 ensures clamping of the insert 1 against the bearing face 5 of the tool-holder.

Figure 5:
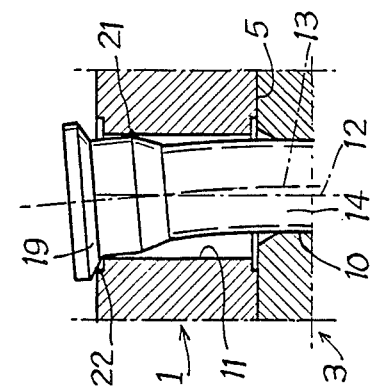
FIGS. 3 to 5 are partial views similar to FIG. 2 shown on a larger scale in synoptic view to illustrate the mode of intervention, phase after phase, of the clamping screw.

It may be advantageous, as shown in FIG. 5, for the shoulder 19 to be truncated so that, due to its slope "b", clamping of the insert on the tool-holder is progressive. This slope may for example be 20 degrees.

It follows from the foregoing that, owing to the particular shape of the head 16 of the screw 15, this screw intervenes first to press the sides 6 and 7 of the insert 1 against the stop faces 8 and 9 of the tool-holder 3 and then to clamp the base 4 of said insert against the bearing face 5 of said tool-holder. These successive phases better ensure clamping of the insert so that the insert is perfectly fast with the tool-holder.

Finally, for the flat fit of the insert on the tool-holder to be guaranteed, it may be advantageous to provide a recess 23 (FIG. 2) in the stop faces 8 and 9, flush with the bearing face 5. Moreover, it may be advantageous to give these stop faces 8 and 9 a small undercut "d" for the sides 8 and 9 of the insert firstly to bear against the outer edge 24 of the stop faces. The undercut angle "d" may be between 15 minutes and 1 degree. It is preferably equal to 30 minutes.

I claim:

1. A machine tool holder, comprising:
   the tool holder having a screw for holding a cutting insert to the tool holder;
   said tool holder including a bearing surface and having a threaded tool holder hold formed therein and extending to a depth therein from the bearing surface, said tool holder further including at least one stop surface extending from the bearing surface;
   said cutting insert having at least one insert side surface and an insert base surface adapted to contact said at least one stop surface and said bearing surface respectively, said at least one insert side surface and said at least one stop surface thereby forming an undercut angle, said undercut angle being the angle formed by the sides of the surfaces and the point of contact said insert having a cylindrical insert hole formed therein and extending entirely there through from the base surface, said tool holder hole and said insert hole located such that when the insert is positioned in the tool holder with the insert side and base surfaces in contact with the tool holder stop and bearing surfaces, the insert hold is eccentric to the tool holder hole;
   said screw having a threaded shank adapted to be inserted through the cylindrical hole of the insert and threaded into the tool holder hole, said screw further having a screw head including in sequence beginning from the shank end of the screw head between the surfaces, a first head portion having a truncated conical bearing surface interfacing the shank at a first interface and having a first diameter equivalent to the diameter of the shank and extending from the first interface over a length of the screw head to a second diameter larger than the first diameter, a second head portion having a cylindrical bearing surface interfacing the truncated bearing surface at a second interface and having a substantially constant diameter equivalent to the second diameter of the truncated surface at the second interface, and a third head portion having a shoulder interfacing the cylindrical bearing surface at a third interface having a diameter at the third interface equivalent to the second diameter of the cylindrical surface and from the third interface the diameter of the cylindrical surface and from the third interface the diameter of the shoulder increases to a third diameter larger than the second diameter;
   said insert hold having an insert hold diameter of essentially constant magnitude over a portion of the length of the hole that may contact the first head portion of the screw head;
   the dimensions of said first, second and third head portions and said shank being of a magnitude such that the threaded shank of the screw may be inserted through the insert hole and into the tool holder hole and engage the tool holder hole threads without substantial deformation of the screw and with the first portion of the screw head positioned outside of the insert hole and such that as the screw is tightened, the truncated bearing surface of the first portion of the screw head contacts a first outer edge of the insert hole, causing the shank to bend away from the at least one stop face of the tool holder and pressing said at least one insert side surface against said at least one stop surface of the tool holder, and such that further tightening of the screw causes the cylindrical bearing surface at the second interface to contact said first outer edge of the cylindrical hole wherein, as the screw is further tightened, the second head portion continues to contact the cylindrical hole, shortening a bending overhand distance said bending overhang distance being the distance between the point where the side of the screw shank first contacts the side of the tool holder hole and the point where the second head portion contacts the cylindrical hole while maintaining a constant camber distance between the threaded shank and the second head portion in order to further bend the shank away from the at least one stop face of the tool holder and thereby increase the force of the at least one insert side surface against the at lease one stop surface of the tool holder; and such that still further tightening of the screw causing the shoulder to contact a second outer edge of the cylindrical hole to clamp the insert down against the bearing face of the tool holder.

2. The machine tool holder of claim 1, wherein said shoulder is truncated and said truncated portion of said shoulder cooperates with the second edge of said at least one insert side surface to force the insert against the bearing face.

3. The machine tool holder of claim 1, wherein the axial location of the third diameter is further from the shank than axial location of the second diameter and wherein said at least one stop face of the tool holder is recessed at the end proximate the bearing surface.

4. The machine tool holder of claim 3, wherein said shoulder is truncated and the slope of the truncated shoulder is about twenty degrees relative to the axis of the screw so that the clamping of the insert against the tool holder is progressive.

5. The machine tool holder of claim 1, wherein said undercut angle between said at least one top surface of the tool holder and said at least one insert side surface is preferable about 15 minutes to about one degree so said at least one insert side surface bears first against the edge of said at lease one stop surface.

6. The machine tool holder of claim 5, wherein said undercut angle is preferably about thirty minutes.

7. The machine tool holder of claim 6, wherein said at least one stop face of the tool holder is recessed at the end proximate said bearing surface.

8. The machine tool holder of claim 1, wherein said truncated bearing surface preferably has a slope of from about forty-two to about forty-four degrees with respect to the surface of the second head portion.

9. A tool holder having means for holding a cutting insert comprising:

a screw for holding a cutting insert to the tool holder;

said tool holder including a bearing surface and having a threaded tool holder hole formed therein and extending to a depth therein from the bearing surface, said tool holder further including at least one stop surface extending from the bearing surface;

said cutting insert having at least one insert side surface and an insert base surface adapted to contact said at least one stop surface and said bearing surface respectively, said at least one insert side surface and said at least one stop surface thereby forming an undercut angle, said undercut angle being the angle formed by the sides of the surfaces and the point of contact said insert having a cylindrical insert hole formed therein and extending entirely there through from the base surface, said tool holder hole and said insert hole located such that when the insert is positioned in the tool holder with the insert side and base surfaces in contact with the tool holder stop and bearing surfaces, the insert hole is eccentric to the tool holder hole;

said screw having a threaded shank adapted to be inserted through the cylindrical hole of the insert and threaded into the tool holder hole, said screw further having a screw head including in sequence beginning from the shank end of the screw head, a first head portion having a truncated conical bearing surface interfacing the shank at a first interface and having a first diameter equivalent to the diameter of the shank and extending from the first interface over a length of the screw head to a second diameter larger than the first diameter, a second head portion having a cylindrical bearing surface interfacing the truncated bearing surface at a second interface and having a substantially constant diameter equivalent to the second diameter of the truncated surface of the second interface, and a third head portion having a shoulder interfacing the cylindrical bearing surface at a third interface having a diameter at the third interface equivalent to the second diameter of the cylindrical surface and from the third interface the diameter of the shoulder increases to a third diameter larger than the second diameter;

said insert hole having an insert hole diameter of essentially constant magnitude over a portion of the length of the hole that may contact the first head portion of the screw head;

and the dimensions of said first, second and third head portions and said shank being of a magnitude such that the threaded shank of the screw may be inserted through the insert hole and into the tool holder hole and engage the tool holder hole threads without substantial deformation of the screw and with the first portion of the screw head positioned outside of the insert hole and such that as the screw is tightened, the truncated bearing surface of the first portion of the screw head contacts a first outer edge of the insert hole, causing the shank to bend away from at least one stop face of the tool holder and pressing said at least one insert side surface against said at least one stop surface of the tool holder;

and such that further tightening of a screw causes the cycling bearing surface at the second interface to contact a first outer edge of the cylindrical hole wherein as the screw is further tightened, the second head portion continues to contact the cylindrical hole, shortening bending overhang distance said bending overhang distance being the distance between the point where the side of the screw shank that first contacts the side of the tool holder hole and the point where the second head portion contacts the cylindrical hole while maintaining a constant camber distance between the threaded shank and the second head portion in order to further bend the shank away from the at one stop face of the tool holder and thereby increase the force of the at least one insert side surface against said at least one stop surface of the tool holder;

still further tightening of the screw causing the shoulder to contact a second outer edge of the cylindrical hole to clamp the insert down against the bearing face of the tool holder and wherein said at least one stop face of the tool holder is recessed at the end proximate the bearing surface.

* * * * *